United States Patent [19]

Strassel et al.

[11] Patent Number: 5,112,692
[45] Date of Patent: May 12, 1992

[54] POLYVINYLIDENE FLUORIDE COMPOSITE AND METHOD

[75] Inventors: Albert Strassel, Oullins; Gilbert Duperray, Civrieux d'Azergues par Lauzanne, both of France

[73] Assignee: Atochem, Courvevoie, France

[21] Appl. No.: 551,032

[22] Filed: Jul. 11, 1990

Related U.S. Application Data

[63] Continuation of Ser. No. 824,430, Jan. 31, 1986, abandoned.

[30] Foreign Application Priority Data

Feb. 14, 1985 [FR] France .................................. 8502092

[51] Int. Cl.$^5$ ........................ B32B 27/08; B29C 23/00
[52] U.S. Cl. ................................ 428/421; 156/244.11; 428/424.6; 428/476.3; 428/476.9
[58] Field of Search ............ 428/421, 422, 327, 424.6, 428/476.3, 476.9; 156/244.11

[56] References Cited

U.S. PATENT DOCUMENTS 4,563,393  1/1986  Kitagawa et al. .............. 428/422 X
4,592,961  6/1986  Ehrreich ......................... 428/327 X Primary Examiner—Thomas J. Herbert, Jr.

[57] ABSTRACT

A composite material comprising a polyvinylidene fluoride layer, a substrate of a material that does not adhere to polyvinylidene fluoride, and an intermediate layer between said fluoride layer and substrate comprising a blend of polyvinylidene fluoride and a polymer containing carbonyl groups, $$-\underset{\underset{O}{\|}}{C}-,$$

in its polymer chain; the subject blend, and the process of treating a surface to adhere polyvinylidene fluoride thereto.

9 Claims, No Drawings

POLYVINYLIDENE FLUORIDE COMPOSITE AND METHOD

This application is a continuation of application Ser. No. 824,430, filed Jan. 31, 1986, now abandoned.

BACKGROUND OF THE INVENTION

Polyvinylidene fluoride (PVDF) is known to be a material which is difficult to cause to adhere substrate. Numerous solutions have been proposed, one of the most effective of which is to interpose at least one polymer which is compatible with PVDF between the substrate and the PVDF. It is apparent from the prior art solutions that the compatible polymer which can be used as the intermediate contains in its chain a branched carbonyl group in a chain of the type of:

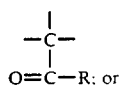

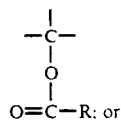

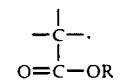

in which R is an alkyl radical.

Thus, methyl polymethacrylate, ethylene-vinyl acetate copolymers and ethylene-vinyl acetate copolymers to which a vinyl acetate polymer is added are used in the French Patents 2,457,180, 1,484,153, and 2,545,040, respectively.

The polymers which are immiscible with PVDF and contain

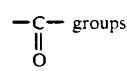 groups in the polymer chain were tested as adhesion intermediates for PVDF. Thus, according to French Patent No. 2,347,402, polyurethane is used as the intermediate. Even though these polymers, containing carbonyl groups in the polymer chain, permit achievement of good adhesion of the PVDF to a substrate with which it is incompatible, a loss of adhesion is observed in the course of atmospheric aging, particularly at high humidity. It can be supposed that in the case of these immiscible polymers, the adhesion achieved with the PVDF is essentially due to the physical bonds; i.e., the hydrogen bonds at the interface of the two polymers, which bonds are eminently sensitive particularly to the water vapor present during any prolonged exposure to adverse weather conditions. Efforts to maintain good adhesion even in humid conditions has not been heretofore achieved.

SUMMARY OF THE INVENTION

The present invention overcomes the prior art problems to provide for adhesion of polyvinylidene fluoride without delamination in humid environments.

Briefly, the present invention comprises a composite material comprising a polyvinylidene fluoride layer, a substrate of a material that does not adhere to polyvinylidene fluoride, and an intermediate layer between said fluoride layer and substrate comprising a blend of polyvinylidene fluoride and a polymer containing carbonyl groups,

in its polymer chain; the subject blend, and the process of treating a surface to adhere polyvinylidene fluoride thereto as hereinafter set forth.

DETAILED DESCRIPTION

According to the present invention, it has been found, for reasons that cannot be explained, that polymers containing carbonyl groups in the polymer chain adhere to PVDF more strongly; do not delaminate, during aging in humid atmosphere, if PVDF is incorporated in them.

It is certainly known that, in general, it is possible to mix other polymers. e.g., those cited in European Patent No. 0003449, to the polymer which adheres to the PVDF. However, the incorporation of any polymer, even those compatible with PVDF, such as polyvinyl acetate, far from bringing about any improvement, gives at best a result that is identical with that obtained with the polymer used alone; which contains carbonyl groups in the polymer chain, in the case of aging in humid atmosphere.

The objective of the present invention is to fix a polymer containing carbonyl groups

in the polymer chain, which polymer is mixed with the PVDF in advance on the surface of a PVDF material to achieve its adhesion to an incompatible substrate.

The polymers which contain carbonyl groups in their chains are chosen, in particular, from among the polymers containing polyurethane groups $-CH_2-NH-\underset{\underset{O}{\|}}{C}O-CH_2-$;

polyurea groups $-CH_2-NH-\underset{\underset{O}{\|}}{C}-NH-$;

polyamide groups $-CH_2-NH-\underset{\underset{O}{\|}}{C}-CH_2-$;

polyester groups $-CH_2-\underset{\underset{O}{\|}}{C}-O-CH_2-$; and ethylene-carbon monoxide groups -

-continued

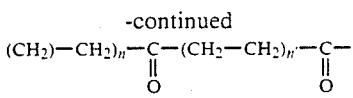

in which n and n' are identical or different from one another and each equal to at least 1.

The polyurethanes which can be used according to the present invention are those usually prepared by the reaction of a diisocyanate with a polyether polyol and/or polyester polyol; the chain prolongation can be brought about by means of at least bifunctional compounds, such as polyacids or polyols.

The polymers containing urea groups are generally polyurethane-polyureas prepared in the conventional manner by the reaction of a diisocyanate, a polyether polyol and/or polyester polyol and a diamine or water.

The polymers containing polyamid sequences are usually prepared from caprolactam, hexamethylenediamine and adipic acid, hexamethylenediamine and sebacic acid, dodecalactam and undecanoic acid. They may also be polyamideimides. The polyamides 6, 6-6, 6-10, 11 and 12 can be mentioned as examples.

All of the polymers which contain ester units in their hydrocarbon chains are suitable. Polyethylene terephthalate, polypropylene terephthalate and polybutylene terephthalate are recommended in particular.

Finally, the copolymers obtained by the copolymerization of at least ethylene and carbon monoxide can also be selected.

All these polymers or copolymers can be used alone or as blends.

As was specified, these polymers are blended with PVDF prior to being fixed on the PVDF surface to be treated. The blend can have weight ratios ranging from 1 to 50 PVDF for 99 to 50 polymer and especially 5 to 30 PVDF.

The PVDF is usually mixed with the polymer in the homopolymer form, but there is no obstacle to using a copolymer; providing that it contains a least 50 wt.% polymerized vinylidene fluoride, and as used herein the term "a polyvinylidene fluoride" is intended to encompass such copolymers and the homopolymer. Whether the PVDF used in the blend formed with the polymer containing carbonyl groups in the chain is identical with or different from that of the material whose surface is treated is also unimportant.

The blend according to the present invention can be fixed on the surface to be treated of the PVDF material, which may be a homopolymer or a copolymer, by any known means.

The mixture may be in the form of a solution or suspension in a solvent, preferably an aprotic polar solvent, such a dimethylacetamide, dimethylformamide or tetrahydrofuran. This solution or suspension is applied on the PVDF surface to be treated, and the entire system is then brought to a temperature between 100° C. and 160° C.

It is also possible to prepare a film from the blend consisting of PVDF and the polymer which contains carbonyl groups in the chain, which said film is placed on the PVDF surface to be treated. The entire system is heated between 100° C. and 180° C. under pressure, and PVDF composite is obtained which will subsequently be able to adhere to a substrate incompatible with PVDF via the treated surface.

A particularly effective method, which permits the treated PVDF material to be obtained directly with an even better adhesion between the PVDF and the blend, consists of coextruding the PVDF to be treated and the blend consisting of PVDF and the polymer containing carbonyl groups in its chain; coextrusion being described in POLYMER PLASTICS TECHNOLOGY AND ENGINEERING (1974), Vol. 3, pp. 49-68: "Coextruded films-Process and proportions" by J. E. GUILLOTTE.

The treated PVDF can be used to coat a substrate which is incompatible with PVDF. The properties of PVDF are known: chemical inertness and resistance to UV radiation, impermeability to liquids and gases, long-term resistance to meteorological conditions, etc. Means have also been currently sought, in view of the adhesion problems, to protect substrates not possessing these properties with PVDF. These protective layers can range from a simply PVDF layer of a few microns in thickness to coatings of several millimeters, as in the case of corrosion protection. Due to the blend coating used for surface treatment, it is possible, for example, to directly hot coat with PVDF a substrate which is able to adhere to the blend used for the treatment. It is also possible to directly manufacture a composite material by coextrusion of PVDF and a thermoplastic polymer incompatible with PVDF, characterized in that a blend of PVDF with a polymer containing carbonyl groups,

in its polymer chain, is coextruded intermediately, which serves as the binder.

According to the latter technique, it is possible, e.g., to directly manufacture a composite consisting of PVDF and polycarbonate, polyethylene, polypropylene, polystyrene, acrylonitrile-butadiene-styrene (ABS), elastomers and polyvinyl chloride. Depending on the different modes of adhering, it is possible to manufacture a composite of PVDF with glass, metal, wood, textile and other materials from the treated PVDF.

The treated PVDF is recommended for the manufacture of composites intended for use in humid atmosphere or composites which will be exposed to adverse weather conditions, e.g., in hothouses, open-air structures, and the like.

The invention will be further described in connection with the following examples which are set forth for purposes of illustration only.

EXAMPLE 1

Two stainless-steel plates are placed between the plates of a press, which press plates are heated at 180° C., and one of the products I through IV as described below is positioned between the said steel plates. After preheating to 180° C. for five minutes, a pressure of 2 bars is applied, and this pressure is maintained for one minute. The two plates are immersed in cold water, and a film with a thickness of ca. 80 to 100 microns is obtained. A composite is prepared under the same conditions as were described above by assembling under pressure the film obtained with a PVDF film (Foraflon 1000 HD) with a thickness of ca. 80 microns.

The adhesion levels between the two films are measured according to the standard ASTM D 1876 by carrying out a peeling test on 25 mm × 180 mm strips at a speed of 250 mm/minute. The results are stated in g/cm.

To evaluate the adhesion over the course of time, an industrial test commonly used for polymer coatings is used, which consists of exposing the composite to an atmosphere saturated with humidity at 75° C.: for example, a hydrophilic cotton swab is soaked in water, and the specimen is placed with it, after which the whole system is sealed in an airtight packet in an oven having a temperature of 75° C. This test is known to permit accelerated simulation of outdoor aging and exposure to adverse weather conditions.

Product (I): ethylene-carbon monoxide-vinyl acetate terpolymer having the following composition in wt.%: ethylene units =68, carbonyl groups =12, and vinyl acetate units =20.

Product (II): blend of (I) with an ethylene-vinyl acetate copolymer containing 14 wt.% vinyl acetate units in the weight ratio of 70-30.

Product (III): blend of (I) with PVDF (Foraflon 6000 HD) in different weight ratios according to the table below.

Product (IV): blend of II with PVDF (Foraflon 6000 HD) in different weight ratios according to the table below:

| Product | | Before aging | After aging for five days at 75° C. in the presence of water vapor |
|---|---|---|---|
| | | Adhesion to PVDF, g/cm | |
| I | | 1800 | 100 |
| II | | 1560 | 60 |
| III | with 5 wt. % PVDF | 1900 | 400 |
| III | with 10 wt. % PVDF | 1950 | 650 |
| III | with 15 wt. % PVDF | >2000 | 900 |
| IV | with 5 wt. % PVDF | 1720 | 280 |
| IV | with 10 wt. % PVDF | 1780 | 550 |
| IV | with 15 wt. % PVDF | 1800 | 690 |

This example illustrates the importance of the presence of PVDF for the adhesion after aging.

EXAMPLE 2

The preparation and testing conditions are the same as in Example 1, and a sequenced polyamide-polyether copolymer (V) (Pebax 2533), as well as a blend (VI) of the copolymer (V) with an ethylene-vinyl acetate copolymer containing 20 wt.% vinyl acetate, are used in the weight ratio of 50/50.

The products (VII) and (VIII) are prepared from the products (V) and (VI), respectively, to which PVDF 6000 HD is added in different proportions.

| Product | | Before aging | After aging for five days at 75° C. in the presence of water vapor |
|---|---|---|---|
| | | Adhesion to PVDF, g/cm | |
| V | | 380 | 100 |
| VI | | 170 | 0 |
| VII | with 5 wt. % PVDF | 450 | 300 |
| VII | with 10 wt. % PVDF | 520 | 300 |
| VII | with 15 wt. % PVDF | 600 | 380 |
| VIII | with 5 wt. % PVDF | 170 | 120 |
| VIII | with 10 wt. % PVDF | 190 | 120 |
| VIII | with 15 wt. % PVDF | 250 | 150 |

EXAMPLE 3

A PVDF coated with a blend formed by 90 wt.% of a thermoplastic polyurethane polymer (IX) containing ester units (Estane 58610) and 10 wt.% PVDF (Foraflon 6000 HD) is prepared under the conditions described in Example 1. A PVDF coated with polymer IX only is prepared under the same conditions for comparison.

| Specimen | Before aging | After aging for five days at 75° C. in the presence of water vapor |
|---|---|---|
| | Adhesion to PVDF, g/cm | |
| PVDF + blend | 1760 | 460 |
| Control | 1800 | <30 |

EXAMPLE 4

Three extruders are available:
the first extruder, an ANDOUARD model, with a screw diameter of 40 mm, contains polyethylene (1005 VN$_2$),
the second, a FAIREX model, with a screw diameter of 25 mm, contains the binder blend as defined below, prepared from Product I in Example 1,
the third extruder, identical with the second one, contains PVDF (Foraflon 4000 HD).

The three extruders feed a multilayer plate nozzle intended for the manufacture of complex films with thicknesses ranging from 200 to 400 microns. The nozzle is followed by a calender heated at 50° C.

The extruders are heated at temperatures ranging from 170° C. to 190° C., and the temperature of the multilayer nozzle is 190° C.

The throughputs of the extruders are controlled in such a way as to obtain a composite with a polyethylene thickness of 200 microns, the binder blend with a thickness of 50 to 80 microns and PVDF thickness of ca. 100 microns.

The binder blends are used in the following weight ratios in the table below.

| Compositions | PVDF 6000 | Polymer (I) | Ethylene-vinyl acetate copolymer containing 18% vinyl acetate |
|---|---|---|---|
| X | 5 | 50 | 45 |
| XI | 10 | 70 | 20 |
| XII | 30 | 45 | 25 |

They are then tested for adhesion in the presence of moisture at 75° C.

| Compositions | Before aging | After aging at 75° C. in the presence of water vapor | | | | |
|---|---|---|---|---|---|---|
| | | 1 day | 2 days | 5 days | 10 days | 30 days |
| | Adhesion to PVDF, g/cm | | | | | |
| X | 520 | 230 | 230 | 200 | 150 | 150 |
| XI | 880 | 650 | 630 | 630 | 610 | 610 |
| XII | 930 | 950 | 950 | 920 | 920 | 920 |
| Under the same conditions but after aging at 75° C. in dry atmosphere: | | | | | | |
| X | 520 | 520 | 520 | 500 | 500 | 500 |
| XI | 880 | 880 | 880 | 850 | 850 | 850 |

| Compositions | Adhesion to PVDF, g/cm | | | | | |
|---|---|---|---|---|---|---|
| | Before aging | After aging at 75° C. in the presence of water vapor | | | | |
| | | 1 day | 2 days | 5 days | 10 days | 30 days |
| XII | 930 | 950 | 980 | 930 | 920 | 920 |

EXAMPLE 5

Four composite are prepared from PVDF film prepared in advance (Foraflon 1000) under the conditions of Example 1.

For the first composite, the PVDF is coated with polyvinyl acetate (PVAC) (XIII).

For the second, the PVDF is coated with thermoplastic polyurethane (Estane 58271) (XIV).

For the third, the PVDF is coated with a polyurethane PVAC blend in the weight proportion of 90-10 (XV).

For the fourth, the PVDF is coated with a polyurethane PVDF (Foraflon 4000 HD) blend in the weight ratio of 90-10 (XVI)

The adhesion test results are presented in the table below.

| Specimens | Adhesion to PVDF, g/cm | |
|---|---|---|
| | Before aging | After aging for five days at 75° C. in the presence of water vapor |
| XIII (Comparative) | >1900 | 30 to 50 |
| XIV (Comparative) | 1800 | <30 |
| XV (Comparative) | >1900 | <50 |
| XVI | 1650 | 520 |

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. A composite material comprising a polyvinylidene fluoride homopolymer layer, a substrate that does not adhere to polyvinylidene fluoride, and an intermediate binder layer between said fluoride layer and substrate comprising a blend of a polyvinylidene fluoride and a polymer containing carbonyl groups,

in its polymer chain, said substrate being free of said carbonyl group containing polymer.

2. The composite of claim 1 wherein said carbonyl group containing polymer is selected from polymers containing polyurethane groups, polyurea groups, polyamide groups, polyester groups, or ethylene-carbon monoxide groups.

3. The composite of claim 1 or 2 wherein said blend contains from about 1 to 50% by weight of polyvinylidene fluoride and correspondingly about 99 to 50 by weight of said carbonyl group-containing polymer.

4. A binder for binding a polyvinylidene fluoride homopolymer layer to a layer of a thermoplastic polymer that does not adhere to polyvinylidene fluoride, comprising a blend of about 1 to 50% by weight of a polyvinylidene fluoride and correspondingly about 99 to 50% by weight of a polymer containing carbonyl groups,

in its chain, said thermoplastic polymer being free of said carbonyl group containing polymer.

5. The binder of claim 4 wherein said carbonyl group containing polymer is selected from polymers containing polyurethane groups, polyurea groups, polyamide groups, polyester groups, or ethylene-carbon monoxide groups.

6. The process of forming a composite by using a binder comprising adhering a polyvinylidene fluoride homopolymer layer to a substrate that does not adhere to polyvinylidene fluoride by applying a binder between said fluoride layer and said substrate; said binder comprising a blend of about 1 to 50% by weight of a polyvinylidene fluoride and corresponding by about 99 to 55% by weight of a polymer containing carbonyl groups

in its polymer chain and said substrate being free of said carbonyl group containing polymer.

7. The process of claim 6 wherein said carbonyl group containing polymer is selected from polymers containing polyurethane groups, polyurea groups, polyamid groups, polyester groups, or ethylene-carbon monoxide groups.

8. The process of claim 7 wherein said substrate is a thermoplastic polymer t hat does not adhere to polyvinylidene fluoride.

9. The process of claim 8 wherein said polyvinylidene fluoride layer intermediate binder, and thermoplastic polymer are coextruded to form the composite.

* * * * *

UNITED STATES PATENT AND TRADEMARK OFFICE
CERTIFICATE OF CORRECTION

PATENT NO. : 5,112,692
DATED : May 12, 1992
INVENTOR(S) : Strassel et al

It is certified that error appears in the above-indentified patent and that said Letters Patent is hereby corrected as shown below:

Col. 8, line 10, cancel "50by" and substitute therefor -- 50% by --;

Col. 8, line 38, correct "55%" to read "50%";

Col. 8, line 53, cancel "t hat" and substitute therefor -- that --; and

Col. 8, line 56, after "layer" insert a comma (,).

Signed and Sealed this

Thirteenth Day of July, 1993

Attest:

MICHAEL K. KIRK

Attesting Officer

Acting Commissioner of Patents and Trademarks